United States Patent [19]
Yarnell

[11] 4,448,094
[45] May 15, 1984

[54] APPARATUS FOR SWITCHING ENGINE GOVERNOR

[75] Inventor: James A. Yarnell, Temperance, Mich.

[73] Assignee: Dana Corporation, Toledo, Ohio

[21] Appl. No.: 282,246

[22] Filed: Jul. 13, 1981

[51] Int. Cl.³ .................. B60K 41/14; B60K 41/16; G05G 5/10
[52] U.S. Cl. .................................. 74/872; 74/477; 74/878
[58] Field of Search .............. 74/859, 860, 872, 878, 74/477

[56] References Cited

U.S. PATENT DOCUMENTS

| | | | |
|---|---|---|---|
| 1,089,053 | 3/1914 | Hodgkinson | 74/860 |
| 2,312,549 | 3/1943 | Hiner | 74/878 |
| 2,474,316 | 6/1949 | May | 74/860 |
| 2,709,376 | 5/1955 | Manchester | 74/872 |
| 2,775,901 | 1/1957 | Perkins | 74/477 |
| 3,945,458 | 3/1976 | Suzuki | 74/477 |
| 4,077,283 | 3/1978 | Hammond | 74/860 |
| 4,337,675 | 7/1982 | Holdeman | 74/477 |

Primary Examiner—Allen D. Herrmann
Assistant Examiner—Bruce Wojciechowski
Attorney, Agent, or Firm—Emch, Schaffer & Schaub

[57] ABSTRACT

The invention is apparatus for switching operating ranges for an air actuated governor for an engine for a vehicle. The governor establishes a maximum rpm for the engine when air under pressure is supplied to the governor and a lower maximum rpm for the engine when the supply of air to the governor is interrupted. The lower rpm range of the governor is engaged when the transmission of the vehicle is in a preselected gear.

8 Claims, 6 Drawing Figures

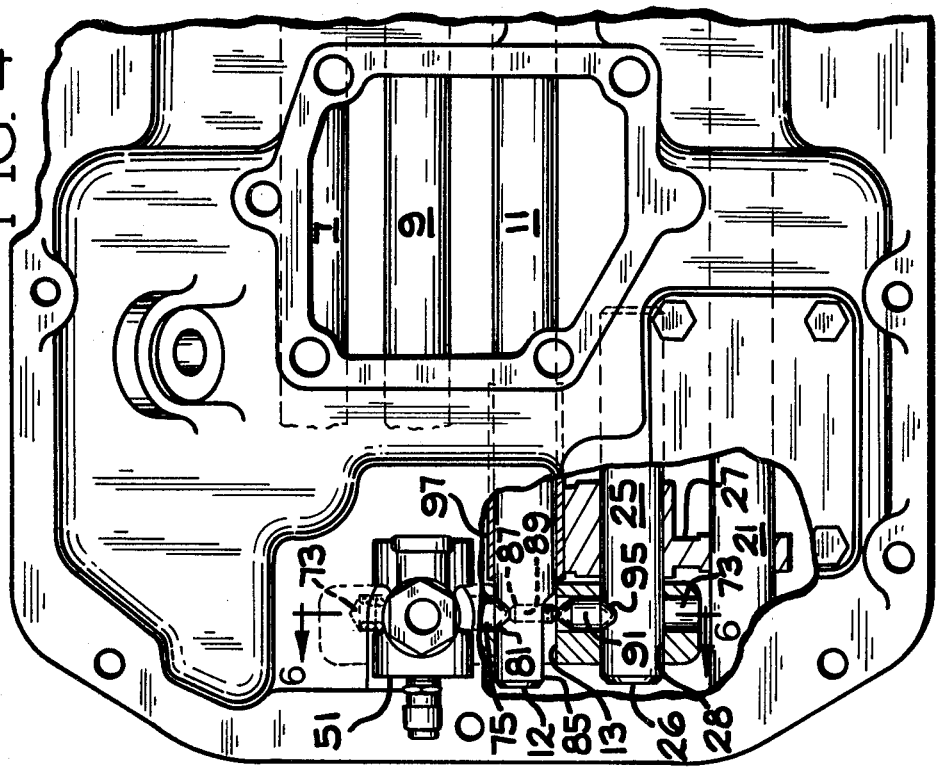
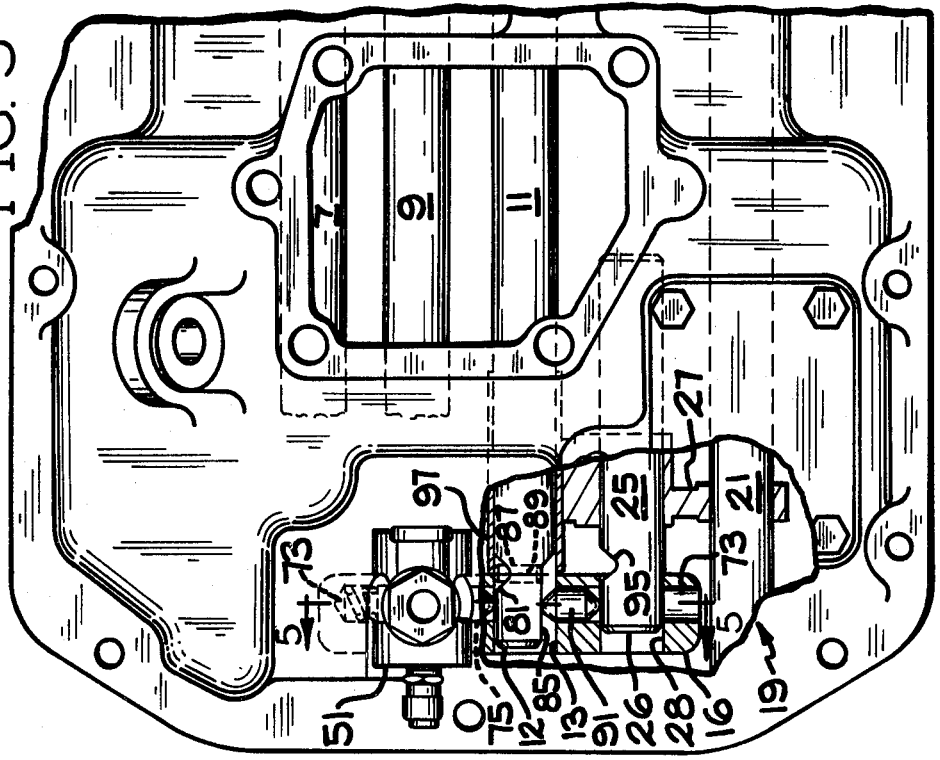

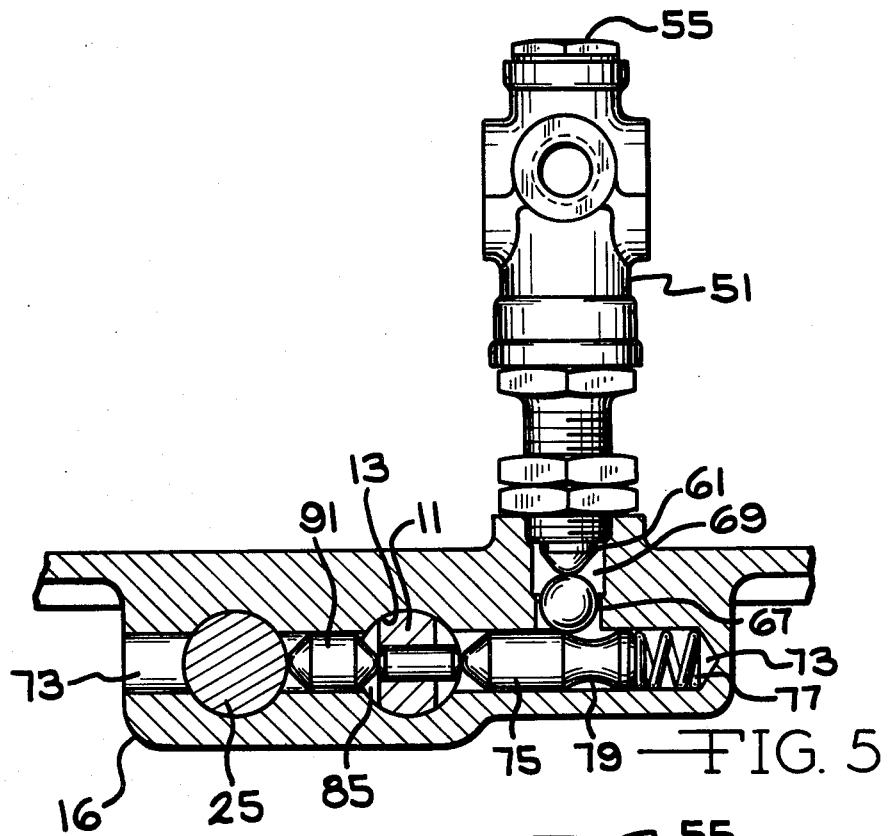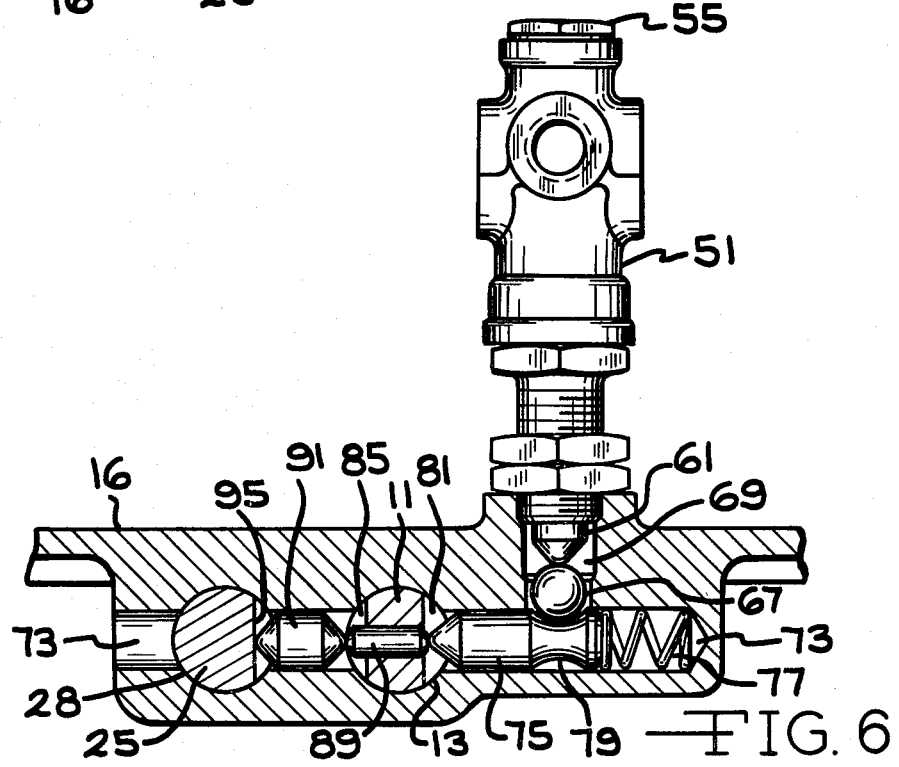

APPARATUS FOR SWITCHING ENGINE GOVERNOR

BACKGROUND OF THE INVENTION

The invention relates to an apparatus for controlling an air actuated governor that controls the speed of an engine in a vehicle. The governor is designed to allow the engine to operate up to a preselected maximum rpm when air under pressure is supplied to the governor and at a lower maximum rpm when the supply of air to the governor is interrupted. This invention is particularly designed for use on a transmission having a splitter gear incorporated as part of the transmission. In one of the more specific aspects of the present invention, the manual shift rod in the transmission and the splitter shift rod must be in alignment in the selected gear to disrupt the flow of air under pressure to the governor to change the maximum rpm setting in the governor.

Air controlled speed governors have been used on engines for industrial and commercial vehicles for a number of years. The speed governors are actuated by air under pressure that is supplied to the governor. The pressurized air actuates the governor and allows the engine of the vehicle to accelerate until a maximum rpm for the engine is obtained. Normally a maximum rpm in the range of 2100 to 2600 rpm is desirable for a commercial or industrial diesel powered vehicle. The operator of the vehicle, will shift through the gears in the transmission of the vehicle until the desired operating speed is reached. Normally the vehicle is held in a particular gear until the maximum rpm level for the engine is reached and then the transmission is shifted into the next gear. This gear shifting process is repeated until the desired operating speed is achieved. During the shifting of the vehicle, air under pressure is supplied to the governor and the engine is free to accelerate up to the maximum rpm level.

However, on a number of vehicles it is desirable to limit the maximum rpm in the highest gear of the transmission to keep the vehicle from exceeding the maximum speed allowed on the nation's highways. It is also frequently desirable to limit the maximum rpm in high gear to keep the engine operating in its most efficient rpm range during extended use on the highway. Accordingly, the air actuated governor is designed to limit the maximum rpm at which the engine can operate to a predetermined level when the supply of air under pressure to the governor is interrupted. This preselected maximum rpm level normally corresponds with an rpm level that is at or about the maximum legal speed or approximates the most effective rpm range at which the engine can be operated It is usually desirable to reduce the maximum rpm setting of the governor in only certain gears of the transmission and usually only in the highest gear of the transmission. This is because the vehicle will normally be in this highest gear during most of its operation on the highway. It is more important for the engine to be operating at its maximum efficiency during this mode of operation. In addition, it is also frequently necessary to have additional power available in the lower gears to allow the vehicle to accelerate and operate effectively when fully loaded. Therefore, it is important to allow the engine to accelerate to the maximum rpm level in these lower gears to provide additional power and acceleration for the vehicle.

Further, the limitations on the maximum engine rpm to stay within the maximum legal speed are not as significant in the lower gears. In these lower gears the vehicle is usually not capable of obtaining the maximum legal highway speed. Therefore if it is desirable to restrict the maximum speed of the vehicle to approximately the maximum legal speed it is usually only necessary to alter the maximum rpm setting of the governor in the highest gear for the transmission.

A number of transmission used for industrial and commercial applications contain a splitter gear which effectively doubles the number of gears present in the transmission. In a transmission with a splitter gear the transmission is manually shifted into the highest manually selected gear and the splitter gear is engaged to obtain the highest gear in the transmission. Therefore, in a transmission with a splitter it is necessary to coordinate the position of the manually shifted gears and the splitter gear to determine when the transmission is in top gear to disrupt the flow or pressurized air to the governor to reduce the maximum permissible engine rpm.

Accordingly, there is a need in the industrial and commercial vehicle field for a device to determine the position of the manually selected gears and the splitter gear in a transmission. The device should be capable, when the manually selected gears and splitter gear are in the preselected position, of causing the interruption of the flow of pressurized air to the governor on the engine on the vehicle to reduce the maximum permissible engine rpm.

SUMMARY OF THE INVENTION

According to the invention, there is provided apparatus for switching operating ranges for an air actuated governor for an engine for a vehicle. The governor establishes a maximum rpm for the engine when air under pressure is supplied to the governor and a lower maximum rpm for the engine when the supply of air to the governor is interrupted. The lower rpm range of the governor is selected when the transmission of the vehicle is in a preselected gear. The apparatus comprises a transmission having a plurality of gears for driving the vehicle including a splitter gear. A sliding shift rod is positioned in the transmission for manually selecting the gears in the transmission. A splitter shift rod is positioned in the transmission for engaging the splitter gear. A source of air under pressure is provided for actuating the governor. A valve for controlling the supply of air to the governor is positioned on the transmission. The valve includes a valve stem for controlling the flow of air through the valve to the governor. The valve stem is operatively connected to the sliding shift rod and the splitter shift rod. The valve stem moves to a position when the sliding shift rod and the splitter shift rod are in alignment in a preselected gear whereby the supply of air to the governor is interrupted and the governor switches to the lower maximum rpm range.

It is an object of the invention to provide an improved apparatus for switching the operating range of an air actuated governor.

It is also an object of the invention to provide apparatus for switching the operating range for an air operated governor for a transmission having a splitter gear where the switch in the operating range occurs when the transmission is shifted into a preselected gear.

Other objects and advantages of the invention will become apparent as the invention is described hereinafter in detail and with reference to the accompanying drawings.

DESCRIPTION OF THE DRAWINGS

FIG. 3 is a partial plan view with a cross sectional view of a portion of the invention;

FIG. 4 is a partial plan view with a cross sectional view of a portion of the invention;

FIG. 5 is a partial cross sectional view taken along line 5—5 in FIG. 3; and

FIG. 6 is a partial cross sectional view taken along line 6—6 in FIG. 4.

DESCRIPTION OF THE PREFERRED EMBODIMENTS

Figure 1:
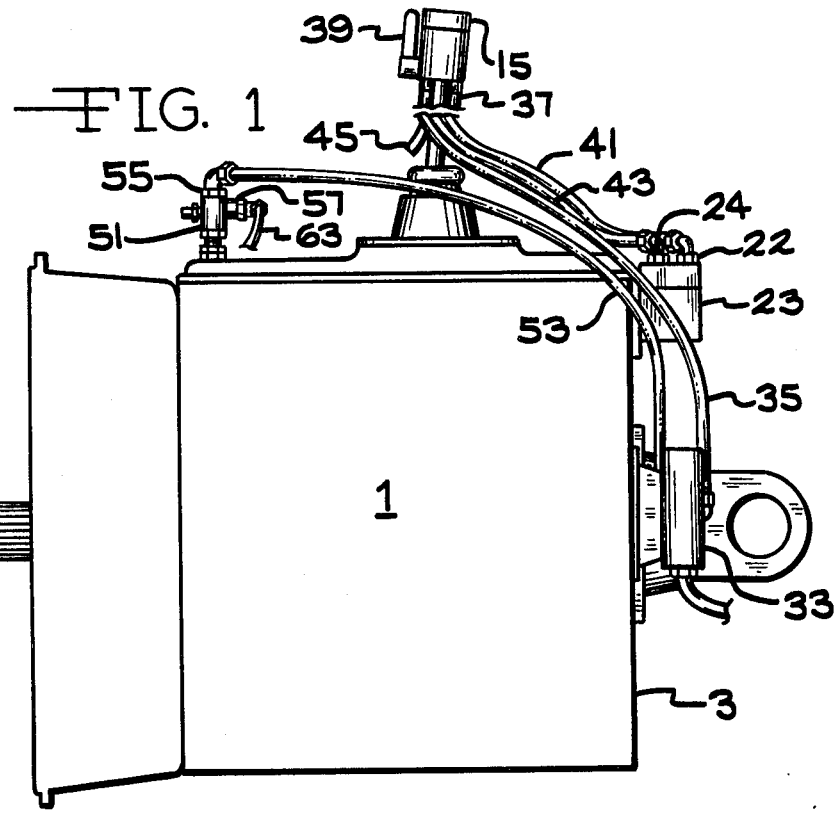
FIG. 1 is a side elevation view of the governor switching apparatus of the present invention.
Figure 2:
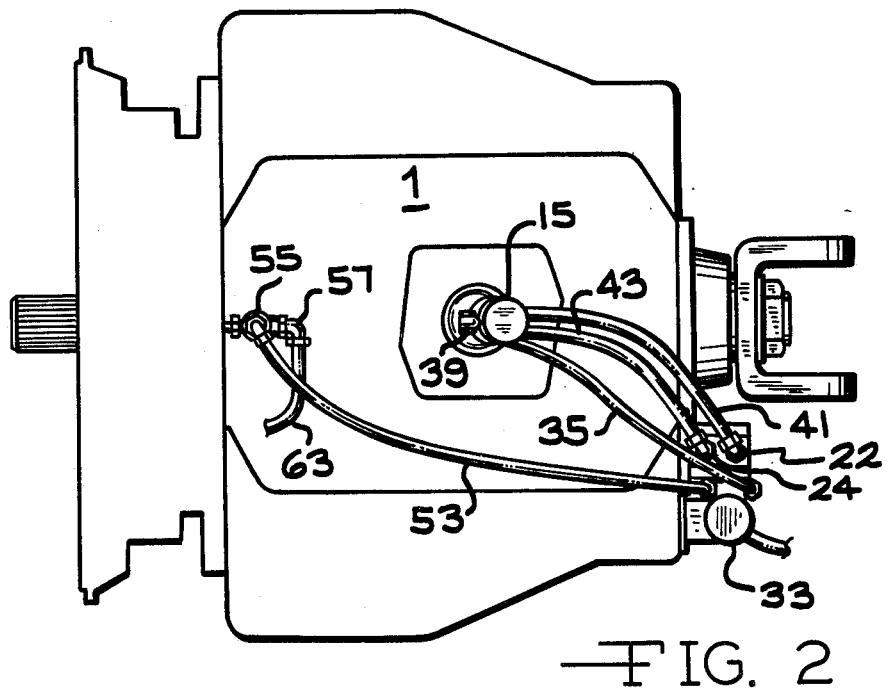
FIG. 2 is a plan view of the invention.

The invention of the present case is directed to an apparatus for controlling an air actuated governor for the engine of a vehicle. More particularly the supply of pressurized air to the governor is controlled to control the maximum operating speed for the motor of a vehicle. The features of the invention will be more fully understood by referring to the attached drawings in connection with the following description of the invention.

The invention is used in connection with a transmission 1 for a motorized vehicle. The transmission has an outer casing 3 and in the interior of the outer casing 3 there are a plurality of gears (not shown) that are used to take the power supplied by the engine to drive the vehicle. In the transmission shown there is a first sliding shift rod 7, a second sliding shift rod 9 and a third sliding shift rod 11. The plurality of gears are mounted on the first, second and third sliding shift rods in the transmission. The first shift rod 7 is normally used to engage reverse and first manually shifted gears in the transmission. The second shift rod 9 is normally used to engage second and third manually shifted gears in the transmission. The third shift rod 11 is used to engage fourth and fifth manually shifted gears in the transmission. One end 12 of the third shift rod 11 extends beyond the ends of the first and second shift rods. The end 12 extends into aperture 13 positioned in member 16. The third shift rod 11 is slideably positioned in the aperture 13 to allow for movement of the third shift rod. During normal operation of the transmission at least a portion of the third shift zod 11 is positioned in the aperture 13. The first sliding shift rod 7, second sliding shift rod 9 and third sliding shift rod 11 are operatively connected to a manual gear shift lever 15 for the transmission. By movement of the gear shift lever 15 the position of the first sliding shift rod, second sliding shift rod and third sliding shift rod can be varied to select the various gears in the transmission. The operation and configuration of the gear sets and sliding shafts within the transmission are standard components of any transmission and as such will not be described in detail.

The transmission 1 also contains a splitter 19 that is connected to the gears of the transmission. The splitter includes a main splitter shift rod 21 slideably positioned in the transmission. One end of the main splitter shift rod is connected to an air cylinder 23 located on the rear of the transmission. The other end of the main splitter shift rod is slideably journaled in a bearing near the front of the transmission 1. A splitter gear (not shown) is positioned adjacent and operatively connected to the main splitter shift rod. The splitter gear is normally positioned near the front of the transmission. The splitter gear interacts with the manually shifted gears of the transmission to effectively double the number of gears in the transmission for the vehicle. The operation and configuration of the splitter gear within the transmission is a standard item in the industry and will not be described in detail.

The air cylinder 23 is securely positioned on the rear of the outer casing 3 of the transmission. The air cylinder contains a slideable piston and a piston rod is secured to the piston. The end of the piston rod that is spaced apart from the piston is connected to the main splitter shift rod. The air cylinder has a first inlet 22 and a second inlet 24 that are in communication with the interior of the air cylinder. The first and second inlets are disposed on opposite sides of the piston located in the air clyinder.

A secondary splitter shift rod 25 is positioned adjacent the main splitter shift rod 21. The secondary splitter shift rod is moveably positioned within the outer case 3 of the transmission 1. One end 26 of the secondary splitter shift rod 25 is positioned in aperture 28 located in the member 16. The secondary splitter shift rod 25 is slideably positioned in the aperture 28. During normal operation of the splitter at least a portion of the secondary splitter shift rod is positioned in the aperture 28. A bracket 27 is secured to the secondary splitter shift rod 25 and the bracket engages the main splitter shift rod. Accordingly, any movement of the main splitter shift rod will cause the secondary splitter shift rod to move in the same direction due to the interconnection between these two rods by the bracket 27.

Air under pressure is supplied from the engine of the vehicle to air regulator valve 33. The pressurized air passes through conduit 35 to a distribution valve 37 located on the upper end of the gear shift lever 15. A control lever 39 is positioned on the shift lever 15 to control the distribution of pressurized air through the distribution valve. From the distribution valve 37 a first conduit 41 connects to the first inlet 22 on one side of the air cylinder 23. A second conduit 43 connects to the second inlet 24 on the air cylinder 23. An exhaust conduit 45 is also connected to the distribution valve 37. The first conduit 41 and second conduit 43 are connected to opposite sides of the piston in the air cylinder 23.

Air under pressure from the air regulator valve 33 is also provided to the governor valve 51 through tube 53. The governor valve has an inlet 55 for receiving the pressurized air from tube 53 and a discharge opening 57 for discharging the pressurized air from the governor valve. The governor valve 51 also includes a valve stem 61 that controls the flow of pressurized air from the inlet 55 to the discharge opening 57. The valve stem is biased to move in a direction away from the inlet 55 to close the governor valve and to prevent the flow of pressurized air from the inlet 55 to the discharge opening 57. A conduit 63 is connected to the discharge opening 57 at one end and to the governor for the engine of the vehicle at the other end. The governor is a standard air operated governor frequently found on industrial and commercial vehicles. The governor is designed to limit the rpm of the engine of the vehicle to a preselected level when pressurized air is supplied to the governor. When the supply of pressurized air is interrupted the governor is designed to limit the rpm level to a lower preselected value. As the governor is a standard item used on industrial and commercial vehicles a detailed explanation of the governor will not be provided.

The governor valve 51 is mounted on the outer casing 3 of the transmission 1. The valve stem 61 of the governor valve 51 extends in to the interior of the outer casing. The end of the valve stem 61 that extends into the outer casing extends into passageway 69 in the member 16. The passageway 69 connects with cavity 73 located in the member 16. The cavity 73 extends along the member 16 and intersects the aperture 13 for the third shift rod 11 and the aperture 28 for the secondary splitter shift rod 25. A ball 67 is positioned in the passageway 69 and the ball is in contact with the end of the valve stem 61. A plunger pin 75 is positioned in the cavity 73 adjacent the ball 67. One end of the plunger pin 75 engages the end of the third shift rod 11 that extends into the cavity 73. The other end of the plunger pin 75 engages a spring 77. The spring 77 acts to bias the plunger pin towards the third shift rod 11. The plunger pin also contains a recessed region 79 that is disposed for receiving the ball 67. When the plunger pin 75 is in its normal position as shown in FIG. 5, the ball 67 will be in contact with a portion of the plunger pin adjacent the recessed region 79. In this position the ball acts as a stop to prevent the valve stem from moving in a direction away from the inlet 55 for the governor valve 51.

The third shift rod 11 contains a notch 81 in the surface that is adjacent the plunger pin 75. The notch is on the portion of the third shift rod 11 that can advance into aperture 13 and come into alignment with the cavity 73. The surface of the third shift rod opposite the notch 81 contains a cut out portion 85. An aperture 87 extends through the third shift rod from the notch 81 to the cut out portion 85. The cut out portion 85 extends substantially from the aperture to the end of the third shift rod that extends through the aperture 13 in the member 16. An interlock pin 89 is slideably positioned in the aperture 87 in the third shift rod. An interlock 91 is positioned in the cavity 73 with one end of the interlock positioned in the cut out portion 85 in the third shift rod 11. The other end of the interlock 91 engages a portion of the secondary splitter shift rod 25 that extends into aperture 28 and into alignment with the cavity 73. The secondary splitter shift rod contains a a notch 95 and the notch can be positioned for engaging the interlock 91 positioned in the cavity 73 .

As can be seen in FIGS. 3 and 4 a sleeve 97 has been positioned around the main shift rod 11 to maintain the interlock pin 89 in the aperture 87 when the main shift rod 11 is in a position where the interlock pin 89 is not in engagement with the plunger pin 75 and the interlock 91.

The operation of the invention will be more fully understood by referring to the attached drawings in connection with the following description.

The transmission 1 is operated by the gear shift lever 15 which is used to select and move either the first sliding shift rod 7, second sliding shift rod 9 or third sliding shift rod 11 in the transmission to obtain the proper gear for driving the vehicle. The shift lever 15, therefore, takes care of the manual shifting of the gears in the transmission. There is also the splitter 19 which is used to engage the splitter gear in the transmission. The splitter 19 is operated by air cylinder 23. Pressurized air from the air regulator valve 33 passes through supply conduit 35 to the distribution valve 37 located on the shift lever 15. From the distribution valve there is a first conduit 41 that connects to the first inlet 22 on one side of the air cylinder 23 and a second conduit 43 that connects to the second inlet 24 on the opposite side of the air cylinder 23. The control lever 39 connected to the distribution valve 37 distributes the pressurized air into either the first conduit 41 or the second conduit 43. The air cylinder 23 contains an air driven piston which is operatively connected to the main splitter shift rod 21 located in the transmission 1. When the control lever 39 is positioned to channel the pressurized air through first conduit 41 the pressurized air acts on the piston in the air cylinder and causes the piston to move towards the outer casing 3 of the transmission. This movement of the piston causes the main splitter shift rod 21 to advance away from the air cylinder 23 and to engage the splitter gear in the transmission. When the lever 39 is positioned to cause the pressurized air to flow through the second conduit 43 the pressurized air will act on the piston in the air cylinder in a manner to cause the piston to move in a direction away from the transmission 1. This movement of the piston causes the main splitter shift rod to advance towards the air cylinder 23 and to disengage the splitter gear in the transmission. The conduit connected to the air cylinder 23 that is not being used to supply pressurized air to the cylinder will act as a return conduit to evacuate air from the non-driven side of the piston back to the distribution valve. The air that returns to the distribution valve 37 in this manner is discharged from the distribution valve through exhaust conduit 45. By providing for the evacuation of air from the non-driven side of the piston in the air cylinder 23 the piston can move more quickly to complete the shift to engage or disengage the splitter gear.

During the shifting of the transmission it is usually desirable to allow the engine to obtain substantially its maximum operating rpm prior to shifting. To allow the engine to reach this maximum rpm level the governor must be supplied with pressurized air to actuate the governor. The pressurized air is supplied from the air regulator valve 33 through passageway 53 to the governor valve 51. The pressurized air enters inlet 55 in the valve 51 and is discharged through opening 57 into conduit 63. The conduit 63 transfers the pressurized air to the governor located on the engine. When the pressurized air is received by the governor the governor will be engaged and allow the engine to obtain its maximum operating rpm as the vehicle is shifted through the various gears in the transmission.

To insure that the pressurized air passes through the governor valve 51 to the governor on the engine the valve stem 61 in the governor valve must be maintained in the position shown in FIG. 5. If the valve stem 61 is allowed to move in a direction away from the inlet opening 55 the valve will close and prevent the flow of air through the valve to the governor on the engine on the vehicle.

In shifting through the gears on the transmission the shift lever 15 is used to engage the gears on first sliding shaft 7 then the gears on second sliding shaft 9 and finally the gears on the third sliding shift rod 11 as the speed of the vehicle increases. After each gear in the transmission is manually engaged by the shift lever 15 the next gear is engaged by activating the splitter through control lever 39 and distribution valve 37. In shifting the transmission first gear is engaged manually by the shift lever 15. When the maximum engine rpm is reached in first gear the control lever 39 is shifted to engage the splitter gear to move the transmission into second gear. To engage third gear the transmission is moved into neutral the splitter disengaged by moving control lever 39 and shift lever 15 is used to manually shift into third gear. To obtain fourth gear the control lever 39 would be positioned to again engage the splitter gear in the transmission. This pattern of shifting is continued to shift through the gears in the transmission 1.

The highest gear in the transmission shown is obtained by manually moving the shift lever 15 to advance the third shift rod 11 in a direction away from the air cylinder 23. In this manner ninth gear is engaged when working with a 10-speed transmission for a vehicle. To engage tenth gear the control lever 39 on the shift lever 15 is positioned to engage the splitter gear in the transmission.

As can be seen in FIG. 4 when the transmission is placed in the highest gear the notch 95 in the secondary splitter shift rod 25 is in alignment with the interlock 91 and the notch 81 in the main shift rod 11 is in alignment with the plunger pin 75. Accordingly, the spring loaded plunger pin will move in a direction toward the main shift rod 11 into the notch 81. As the plunger pin moves into the notch 81 the interlock pin 89 in the aperture 87 in the main shift rod 11 is displaced towards the secondary splitter shift rod 25. The movement of the interlock pin 89 causes the interlock 91 to move into engagement with the notch 95 in the secondary splitter shift rod 25. As can be seen in FIG. 6 when the plunger pin 75 advances towards the main shift rod 11 in the manner just described the recessed region 79 on the plunger pin is in alignment with the ball 67. The ball is caused to move into the recessed region due to the biasing force exerted on the ball by the valve stem 61. When the ball 67 is in recessed region 67 the displacement of the valve stem 61 closes the governor valve 51 and air under pressure no longer flows through the valve 51 to the governor on the engine of the vehicle. The air actuated governor then switches to a secondary operating mode that reduces the maximum rpm level at which the engine can operate.

The disruption of the air flow through the governor valve 51 only occurs when the third shift rod 11 and the secondary splitter shift rod 25 are in position to engage high gear and the notch 81 in a main shift rod and the notch 95 in the secondary splitter shift rod are in alignment in the cavity 73. If the main shift rod 11 is not in the proper position the plunger pin is not in alignment with the notch 81 and the plunger pin is not capable of being displaced toward the main shift rod 11. If the secondary splitter shift rod is not in the proper location for engaging high gear the notch 95 is not in alignment with the interlock 91 and the interlock 91 is not capable of moving toward the secondary splitter shift rod. If the interlock 91 is not positioned in the notch 95 in the secondary splitter shift rod the plunger pin 75 is not free to move towards the main shift rod 11 even if the plunger pin is in alignment with the notch 81 in the main shift rod 11. This results because the interlock pin 89 is engaged by the interlock 91 and is prevented from moving towards the secondary splitter shift rod 25. The interlock pin, therefore, obstructs the movement of the plunger pin 75 towards the secondary splitter shift rod 25. The interlock pin will obstruct the movement of the plunger pin until the interlock 91 is in alignment with and can move into the notch 95 on the secondary splitter shaft. Once the interlock moves into the notch 95 the interlock pin can be displaced towards the secondary splitter shaft and allow movement of the plunger pin 75 towards the third shift rod 11. The ball 67 can only be displaced when the plunger pin has advanced into the notch 81 and the recessed region 79 is in alignment with the ball. When the ball 67 is positioned in the recessed region 79 the valve stem 61 advances towards the plunger pin and closes the governor valve 51. The governor valve remains closed until either the third shift rod 11 or main splitter shift rod 25 are moved to disengage high gear in the transmission. When the transmission is no longer in high gear the notch 81 and the notch 95 are no longer in alignment and the plunger pin 75 is caused to advance in a direction away from the third shift rod 11. The movement of the plunger pin causes the recessed region 79 to move out of alignment with the ball 67 causing the ball and valve stem 61 to move towards the inlet 55 of the governor valve 51 to open the governor valve.

The present invention has been described to show that a governor on the engine of a vehicle can be shifted into a different operating range when high gear in the transmission for the vehicle is engaged. Although this is the normal operation of the invention, it should be noted that the governor can be caused to switch to a different operating range in any desired gear of the transmission by having the appropriate alignment of the manual shift rod and the splitter shift rod for that selected gear.

Having described the invention in detail with reference to the drawings, it is understood that such specifications are given for the sake of explanation. Various modifications and substitutions, other than those cited can be made without departing from the spirit and scope of the invention as defined in the following claims.

What I claim is:

1. Apparatus for switching operation ranges for an air actuated governor for an engine of a vehicle, said governor establishing a maximum rpm for said engine when air under pressure is supplied to said governor and a lower maximum rpm for said engine when said supply of air to said govenor is interrupted, said lower rpm being selected when the transmission of said vehicle is in a preselected gear; said apparatus comprising:

at least one sliding shift rod for mounting gears positioned in said transmission, said sliding shift rod containing a notch on one end, said sliding shift rod being disposed for engaging a gear in said transmission;

a sliding splitter shift rod for mounting a splitter gear positioned in said transmission, said sliding splitter shift rod being disposed for engaging said splitter gear;

a secondary splitter shift rod positioned in said transmission adjacent to and connected to said splitter shift rod, said secondary splitter shift rod containing a notch on one end, said notch on said secondary splitter shift rod being disposed to be in alignment with said notch on said sliding shift rod when said shift rod is positioned to engage a preselected gear in said transmission;

a valve for controlling said supply of air to said governor, said valve including a valve stem for controlling the flow of air through said valve to said governor, said valve stem being operatively connected to said sliding shift rod and said splitter shift rod; and an interlock means operatively connected to said valve stem of said valve, said interlock means engaging said notch in said sliding shift rod and said notch in said secondary splitter shift rod when said shift rod is positioned to engage a preselected gear in said transmission whereby said interlock means allows said valve stem to move to a position when said transmission is in a preselected gear whereby said supply of air to said governor is interrupted and said governor switches to said lower maximum rpm range.

2. The apparatus of claim 1 wherein said valve stem is biased to move towards said interlock means, said valve stem moving towards said interlock means when said interlock means engages said notch in said sliding shift rod and said notch in said secondary splitter shift rod whereby the flow of air through said valve to said governor is interrupted.

3. The apparatus of claim 2 wherein said transmission contains a member, said member defining a cavity, a passageway connected to said cavity, a first aperture passing through said member and in communication with said cavity and a second aperture passing through said member and in communication with said cavity, a portion of said valve stem positioned in said passageway and extending into said cavity, said end of said sliding shift rod containing said notch positioned in said first aperture, said end of said secondary splitter shift rod containing said notch extending into said second aperture, said interlock means being positioned in said cavity and operatively connected to said valve stem, said sliding shift rod and said secondary splitter shift rod.

4. The apparatus of claim 3 wherein said interlock means includes a plunger pin located in said cavity, said plunger pin positioned adjacent said sliding shift rod, one end of said plunger pin being disposed for engaging said notch in said sliding shift rod when said transmission is in said preselected gear, said plunger pin having a body portion containing a recessed region therein, said body portion and recessed region being disposed for engaging said valve stem, said body portion engaging said valve stem when said transmission is not in said preslected gear and said recessed region engaging said valve stem when said transmission is in said preselected gear, said recessed region being positioned to allow said valve stem to move to a position to interrupt the flow of air to said governor, said plunger pin being biased to advance towards said sliding shift rod.

5. The apparatus of claim 4 wherein an aperture is positioned in said sliding shift rod, said aperture extending from said notch to the other side of said sliding shift rod.

6. The apparatus of claim 5 wherein an interlock pin is slideably positioned in said aperture in said sliding shift rod, said interlock pin being positioned to engage said plunger pin when said plunger pin is in alignment with said notch.

7. The apparatus of claim 6 wherein an interlock is positioned in said cavity between said sliding shift rod and said secondary splitter shift rod, one end of said interlock is positioned for engaging said interlock pin and the other end of said interlock is positioned for engaging said notch in said secondary splitter shift rod.

8. Apparatus for switching operating ranges for an air actuated governor for the engine of a vehicle in response to engaging a preselected gear in the transmission of said vehicle, said governor establishing a maximum rpm for said engine when air under pressure is supplied to said governor and a lower maximum rpm for said engine when the supply of air is interrupted, said apparatus comprising:

a plurality of sliding shift rods for mounting gears positioned in said transmission said sliding shift rod for said preselected gear containing a notch on one end thereof and an aperture in communication with said notch, said aperture passing through said sliding shift rod;

a gear shift lever operatively connected to said sliding shift rods for manually selecting and engaging said gears of said transmission;

a sliding splitter shift rod for mounting a splitter gear positioned in said transmission, said sliding splitter shift rod being disposed for engaging said splitter gear;

a secondary splitter shift rod positioned in said transmission adjacent to and connected to said splitter shift rod, said secondary splitter shift rod containing a notch on one end thereof, said notch on said secondary splitter shift rod being disposed to be in alignment with said notch on said sliding shift rod when said shift rod is a member positioned in said transmission, said member defining a cavity, said member having a first aperture and a second aperture, said first and second apertures being in communication with said cavity, said first aperture disposed for slideably engaging said end of said sliding shift rod containing a notch therein, said second aperture disposed for slideably engaging said end of said secondary splitter shift rod containing a notch therein, said member containing a passageway in communication with said cavity;

a plunger pin positioned in said cavity of said member adjacent said passageway, said plunger pin having one end disposed for engaging said notch in said sliding shift rod, the other end of said plunger pin engaging a biasing means that urges said plunger pin towards said sliding shift rod, the body of said plunger pin including a recessed region;

an interlock pin slideably positioned in said aperture in said sliding shift rod;

an interlock member positioned in said cavity between said sliding shift rod and said secondary splitter shift rod, said interlock member having one end positioned for engaging said interlock pin and said other end for engaging said notch in said secondary splitter shift rod;

a valve for controlling said supply of air to said governor, said valve including a valve stem for controlling the flow of air through said valve, one end of said valve stem extending into said passageway in said member and engaging said plunger pin, said end of said valve stem being constructed for engaging said recessed region in said plunger pin, said valve stem engaging said recessed region in said plunger pin when said sliding shift rod and secondary splitter shift rod are positioned to engage said preselected gear and said notch in said sliding shift rod and said notch in said secondary splitter shift rod are in alignment whereby said biased plunger pin moves towards said sliding shifter rod and engages said notch therein causing said interlock pin in said aperture in said sliding shaft to advance towards said secondary splitter shift rod and displacing said interlock member into said notch on said secondary splitter shift rod whereby said recessed region on said plunger pin moves into alignment with said valve stem and said valve stem moves towards said plunger pin to close said valve and interrupts the flow of air through said valve to said governor whereby said governor switches to the lower maximum rpm range.

* * * * *

UNITED STATES PATENT AND TRADEMARK OFFICE
CERTIFICATE OF CORRECTION

PATENT NO. : 4,448,094
DATED : May 15, 1984
INVENTOR(S) : James A. Yarnell

It is certified that error appears in the above—identified patent and that said Letters Patent is hereby corrected as shown below:

```
Column 2, line 10 delete "transmission" and insert --trans-
missions--;                                           Column 3,
line 49 delete "zod" and insert --rod--.
                      Column 10, line 19 after "is"
insert --positioned to engage said preselected gear in said
transmission;--.
```

Signed and Sealed this

Fifth Day of February 1985

[SEAL]

Attest:

DONALD J. QUIGG

*Attesting Officer*     *Acting Commissioner of Patents and Trademarks*